United States Patent Office 3,408,403
Patented Oct. 29, 1968

3,408,403
METHOD OF PRODUCING A MIXTURE OF SULFIDES AND MERCAPTANS
Paul F. Warner, Phillips, Tex., assignor to Phillips Petroleum Company, a corporation of Delaware
No Drawing. Filed Dec. 16, 1964, Ser. No. 418,864
5 Claims. (Cl. 260—609)

ABSTRACT OF THE DISCLOSURE

A mixture of sulfides and mercaptans in a predetermined ratio is produced by reacting a compound with hydrogen sulfide to form mercaptans and sulfides and controlling the temperature of the reaction to produce the predetermined ratio of the compounds.

---

This invention relates to the production of sulfur-containing compounds.

In one of its aspects this invention relates to production of various sulfur-containing compounds including various proportions of at least two different compounds in the same reaction. In another aspect this invention relates to obtaining a desired ratio of different sulfur compounds in a reaction product. In yet another aspect, this invention relates to controlling the reaction variable to obtain a desired ratio of different sulfur-containing compounds from a single reaction. In yet another aspect, this invention relates to obtaining a desired ratio of two different sulfur-containing compounds from a single reaction utilizing a catalyst.

There are many instances when it is desirable to have a mixture of two or more different sulfur-containing compounds in a single mixture. For example, mixtures of mercaptan and sulfide are sometimes desirable to make paint used for stenciling labels in glass bottles which are subsequently fired to fuse the paint into the surface of the glass. For this purpose, pinanyl mercaptan and pinanyl sulfide have been found suitable. However, if these compounds are made from the reaction of alphapinene and hydrogen sulfide, the separation is highly expensive. This is so because the sulfides and the mercaptans boil at the same temperatures, and separation of the two is difficult. The sulfides and mercaptans can also be separated by extraction but this is also tedious and expensive.

I have now discovered a method whereby a mixture of two sulfur-containing compounds in a desired ratio may be obtained, without prior separation.

It is therefore an object of this invention to provide an economical and inexpensive method for obtaining a mixture of two sulfur-containing compounds in a desired ratio.

It is a further object of this invention to provide a product containing a desired ratio of two different sulfur-containing compounds, e.g., sulfides and mercaptans.

Still further, an object of this invention is to provide a low cost method for producing a mixture containing a desired ratio of sulfides and mercaptans from a hydrogen sulfide reaction process without requiring costly separations.

Other aspects, objects, and the several advantages of this invention are apparent from a study of this disclosure and the appended claims.

In accordance with the practice of this invention, a mixture containing a desired ratio of two different kinds of sulfur-containing compounds, e.g., mercaptans and sulfide, is obtained by reacting a compound with hydrogen sulfide and controlling the synthesis temperature to provide the desired ratio of the two sulfur-containing compounds. The compounds which can be reacted with the hydrogen sulfide can be organic compounds which can be reacted with the hydrogen sulfide in the presence of a catalyst. It has also been found desirable to adjust the temperature as necessary to obtain the ratio of the two sulfur-containing compounds that is desired.

The invention has been found to be applicable to the reaction of olefinic compounds with hydrogen sulfide. Of the olefinic compounds, the terpenes have been found to be particularly applicable. Examples of these compounds are pinene, dipentene, terpinene, terpinolene, terpineol, alpha-pinene, beta-pinene, and the like.

If a catalyst is used, any suitable catalyst which will aid the reaction can be used. Suitable catalysts have been found to be alumina, silica-alumina, bauxite, montmorillonite clay, and the like.

Temperatures which have been found to be applicable in the process range from 25° F. to 500° F. Pressures from atmospheric to about 1000 p.s.i.g. are also applicable. The temperature and pressure used in any given reaction depend upon the desired ratio of sulfur-containing compounds, the reactants, and the particular catalyst used, if a catalyst is used in the reaction.

The ratio of sulfur compounds in the mixture will vary depending upon the temperature used. Desirable ratios of mercaptans to sulfides can vary in accordance with the reaction variables, and the ratio may be controlled in accordance with the end use of the composition. The ratios can vary from 0.1:1 to 20:1, and in some cases to 100:1.

In a presently preferred method in accordance with the practice of this invention, alpha-pinene and hydrogen sulfide are passed over a clay catalyst to produce a mixture of pinanyl mercaptan and sulfide. By controlling the synthesis temperature, the desired ratio of mercaptan to sulfide can be obtained.

The invention will be more fully understood and described by reference to the following specific examples. Although the invention can be operated as either a batch or a continuous process, the following specific examples are illustrative of a batch process.

EXAMPLE I

Pint samples of pinanyl mercaptan and pinanyl sulfide made from alpha-pinene at 165, 205, 225, and 250° F. by the Filtrol process were available for sampling. Pertinent data for the samples are as follows:

| Synthesis Temperature, °F | 165 | 205 | 225 | 250 |
|---|---|---|---|---|
| Ratio Mercaptan to Sulfide | 8.5 | 3.4 | 2.4 | 2.0 |
| Mercaptan Purity, wt. percent | 90.6 | 71.2 | 66.7 | 66.2 |

The alpha-pinene used in the work was from the Arizona Chemical Company; it had the following composition by chromatograph:

Wt. percent
Lights ------------------------------------------- .1
Alpha-pinene ------------------------------------ 94.3
Unidentified ------------------------------------ 2.5
Beta-pinene -------------------------------------- 2.8
Heavies ------------------------------------------ .3

Other properties for the alpha-pinene may be found in Table I.

In making the synthesis runs, alpha-pinene was blended with $H_2S$ (Matheson Technical Grade) in a cylinder (1 to 5 mole ratio) and passed over a bed of Filtrol Grade 71 catalyst contained in a 20 foot length of ¼ inch OD aluminum tubing wound into a coil and immersed in a controlled temperature bath. One to two liters of crude product was made at 165, 205, 225, and 250° F. The crude effluent from each synthesis temperature was then fractionated in a 1¼ inch ID by 1 foot long column packed with protruded packing.

TABLE I.—PROPERTIES OF ALPHA-PINENE AND OF PINANYL MERCAPTAN MADE OVER FILTROL AT SEVERAL DIFFERENT TEMPERATURES

|  | Synthesis Temperature, °F. | | | | α-Pinene |
|---|---|---|---|---|---|
|  | 165 | 205 | 225 | 250 |  |
| Refractive Index, 20/4 | 1.5072 | 1.5028 | 1.5010 | 1.5006 | 1.4661 |
| Specific Gravity, 20/D | 0.9655 | 0.9618 | 0.9576 | 0.9593 | 0.8588 |
| Mole weight | 169.5 | 166.1 | 167.4 | 169.3 |  |
| Total Sulfur | 19.1 | 18.2 | 18.0 | 18.8 |  |
| Mercaptan Sulfur | 17.08 | 13.73 | 12.71 | 12.48 |  |
| Mercaptan Purity, wt. percent | 90.6 | 71.2 | 66.7 | 66.2 |  |
| Ratio Mercaptan/Sulfide | 8.5 | 3.4 | 2.4 | 2.0 |  |
| Color, Gardner | 1 |  |  |  | 1+30 |

[1] Saybolt scale.

EXAMPLE II

Alpha-pinene was reacted with hydrogen sulfide in a series of runs. The catalyst case for the runs was made from a 20-ft. long piece of ¼-in. aluminum tubing which was packed with Filtrol Grade 71 catalyst (170 ml.) and then wound into a coil. The catalyst was activated (dried) by placing the coil in an air oven maintained at 400° F. Air was passed through the catalyst bed during the drying operation. The coil was then placed in a temperature controlled bath for the runs. A water bath was used for the runs below 200° F. and an oil bath for the runs above 200° F.

Alpha-pinene (Arizona Chemical, Acintene A) was blended with hydrogen sulfide (Matheson Technical Grade) in a cylinder in a mole ration of 1 to 5 respectively. This mixture was passed over the catalyst bed at 800 p.s.i.g. pressure and at a rate of 1 to 2 volumes per volume of catalyst per hour. The effluent was collected in 200 ml. cuts and each cut was analyzed for mercaptan and total sulfur. The crude mercaptan samples were also analyzed by chromatography. Table II shows the sulfur analyses for samples made over the temperature range 50 to 350° F.

TABLE II.—EFFECT OF SYNTHESIS TEMPERATURE ON THE SULFIDE AND MERCAPTAN SULFUR IN SYNTHESIS OF PINANYL MERCAPTAN FROM ALPHA-PINENE BY THE FILTROL PROCESS

| Synthesis Temperature, °F. | Weight percent | | | Ratio Mercaptan Sulfur to Sulfide Sulfur |
|---|---|---|---|---|
|  | Total Sulfur | Mercaptan Sulfur | Sulfide Sulfur [1] |  |
| 50 | 11.3 | 10.40 | 0.70 | 14.9 |
| 100 | 23.2 | 20.57 | 2.6 | 8.0 |
| 125 | 20.9 | 18.51 | 2.4 | 7.7 |
| 150 | 23.3 | 18.13 | 5.2 | 3.5 |
| 175 | 22.8 | 16.46 | 6.3 | 2.6 |
| 200 | 21.4 | 12.58 | 8.8 | 1.4 |
| 250 | 18.8 | 9.05 | 9.7 | 0.93 |
| 300 | 17.4 | 7.23 | 10.2 | 0.74 |
| 350 | 14.3 | 6.49 | 7.8 | 0.83 |

[1] By subtraction of mercaptan sulfur from total sulfur.

From the foregoing Example I, it can be seen that when a temperature in the range of 205° F. to 250° F. is utilized, a ratio of 3.4 to 2.0 mercaptans to sulfides is obtained which is a desirable ratio of a mixture of mercaptans to sulfides which is used to make paint used for stenciling labels in glass bottles.

Reasonable variation and modifications are possible within the scope of the foregoing disclosure and the appended claims to the invention, the essence of which is that there has been provided a method for producing a mixture of different sulfide compounds in a desired ratio of one sulfide compound to the other.

I claim:

1. The method of producing a mixture of sulfides and mercaptans in a ratio of mercaptan sulfur to sulfide sulfur between 0.1:1 and 20:1 by reacting a terpene with hydrogen sulfide in the presence of a catalyst selected from alumina, silica alumina, bauxite, and montmorillonite clay at a temperature between about 25° F. and about 500° F., determining the ratio of mercaptan sulfur to sulfide sulfur in the reaction product, and varying the reaction temperature during the conducting of subsequent reactions between the same reactants to control the ratio of mercaptan sulfur to sulfide sulfur being produced by increasing the reaction temperature within said temperature range to decrease the ratio of mercaptan sulfur to sulfide sulfur and decreasing the reaction temperature within said temperature range to increase the ratio of mercaptan sulfur to sulfide sulfur.

2. The method of claim 1 wherein said ratio is from 0.83 to about 14.9 and said temperature is in the range of 50 to about 350° F.

3. A method according to claim 1 wherein said ratio is from about 2.0 to about 8.5 and said temperature is in the range of about 165 to about 250° F.

4. The method of producing a mixture of pinanyl mercaptans and pinanyl sulfide having a ratio of mercaptan sulfur to sulfide sulfur between about 0.83:1 and about 14.9:1 by reacting alpha-pinene and hydrogen sulfide in the presence of a clay catalyst at a temperature between about 50° F. and about 350° F., determining the ratio of mercaptan sulfur to sulfide sulfur in the reaction product, and varying the reaction temperature during the conducting of subsequent reactions between the same reactants to control the ratio of mercaptan sulfur to sulfide being produced by increasing the reaction temperature within said temperature range to decrease the ratio of mercaptan sulfur to sulfide sulfur and decreasing the reaction temperature within said temperature range to increase the ratio of mercaptan sulfur to sulfide sulfur.

5. A process according to claim 4 wherein said ratio is in the range of 3.4 to 2.0 and said temperature is in the range of 205 to 250° F.

References Cited

UNITED STATES PATENTS

| 2,211,990 | 8/1940 | Shoemaker et al. | 260—609 |
| 2,352,435 | 6/1944 | Hoeffelman et al. | 260—609 |
| 2,386,770 | 10/1945 | Daley et al. | 260—609 XR |
| 2,426,647 | 9/1947 | Schulze et al. | 260—609 |
| 2,447,481 | 8/1948 | Bell et al. | 260—609 |
| 2,502,596 | 4/1950 | Schulze | 260—609 |
| 2,510,921 | 6/1950 | Bauer | 260—609 |
| 2,610,981 | 9/1952 | Short | 260—609 |
| 2,865,965 | 12/1958 | May et al. | 260—609 |
| 3,045,053 | 7/1962 | Ford | 260—609 |
| 3,114,776 | 12/1963 | Warner | 260—609 |

FOREIGN PATENTS

| 578,124 | 6/1946 | Great Britain. |

CHARLES B. PARKER, *Primary Examiner.*

D. R. PHILLIPS, *Assistant Examiner.*